United States Patent Office 2,827,420
Patented Mar. 18, 1958

2,827,420
THERAPEUTIC TABLETS

Irving B. Wershaw, New York, N. Y.

No Drawing. Application October 24, 1956
Serial No. 617,924

3 Claims. (Cl. 167—82)

This invention relates to a therapeutic tablet for use in making an official Burow's solution, for wet dressing, compresses, wet packs and immersion baths. This invention is an improvement on the therapeutic tablet disclosed and claimed in my United States Patent 2,371,862, granted March 20, 1945.

All percentages and parts herein, unless otherwise indicated, are on a weight basis.

As is well known, Burow's solution has a pH of 4.0 to 4.5. It deteriorates on standing. Accordingly, it is necessary to prepare a fresh solution whenever it is desired to use such solution of optimum concentration having a pH of 4.0 to 4.5. Attempts made prior to the invention of my aforesaid patent to produce a dry mixture of metal acetate and aluminum sulfate in powdered form in proportions to produce an official Burow's solution proved unsuccessful chiefly because reaction inevitably takes place between the powdered constituents resulting in an unstable mixture of uncertain concentration.

In my aforesaid patent I have disclosed a therapeutically active, solid and chemically stable preparation in tablet form consisting of a mixture of calcium acetate powder, dry crystalline aluminum sulfate and desirably a binding agent bonding the particles of the calcium acetate powder and the crystals of aluminum sulfate together. Surprisingly, I found, the use of a crystal form of aluminum sulfate results in a mixture which is chemically stable in the absence of added water. The mixture may contain from 30% to 40% of powdered calcium acetate, 0.6% to 1.2% of powdered acacia or other binder, such as gelatin, 40% to 60% of crystalline aluminum sulfate, 8% to 15% of a water-soluble starch binder, and from 1% to 8%, preferably 3% to 4% of powdered boric acid. The boric acid functions as a lubricant in the tabletting of the mixture, also as a stabilizer for the aluminum acetate formed when the tablet is added to water, and as a buffering agent to produce a solution of constant and desired pH within the range of 4.0 to 4.5.

These tablets when added to a measured amount of water result in a solution containing aluminum acetate and a precipitate of calcium sulfate. They have been found admirably suited for the production of antiseptic and astringent solutions for use as wet dressings, compresses, wet packs and immersion baths. However, the tablets dissolve slowly in water at room temperatures (20° to 25° C.). It is not unusual for tablets to be produced which are hard, tile-like masses requiring crushing for their dissolution in water at room temperature, and even with such crushing and vigorous stirring requiring several minutes for complete dissolution.

Chemists and others concerned with the production and utilization of the tablets of my aforesaid patent have uniformly been of the belief that it is not practical to improve the dissolution of these tablets in water by incorporating an alkaline effervescing material, such as an alkali metal bicarbonate, therein. The reasons for this belief are at least two-fold. In the first place, since the pH of the solution formed upon addition of the tablet to water must be within the narrow range of 4.0 to 4.5, it was the belief that the addition of enough alkali metal bicarbonate to materially improve the dissolution of the tablet would deleteriously affect the pH. Secondly, the tablets invariably contained some acetic acid produced from hydrolysis of aluminum acetate and chemists generally were under the belief that the addition of an alkali metal bicarbonate would result in a reaction between the acetic acid and the alkali metal bicarbonate which would produce unstable tablets. Actually, tablets chosen at random and tested by insertion in a test tube in which was suspended moist litmus paper showed the presence of a volatile acid having the characteristic odor of acetic acid, which acidity is hereinafter referred to as the apparent acidity. This apparent acidity is probably due to initial or partial reaction and hydrolysis taking place within the tablet between the aluminum sulfate and calcium acetate in the presence of water invariably present in the tablet. The water, for example, may be introduced by the calcium acetate, aluminum sulfate, acacia and possibly other constituents, which even though dried before use invariably contained small amounts of water.

It is an object of this invention to overcome the above noted disadvantages and produce a therapeutic tablet which is readily soluble in water at room temperatures and this without the necessity of crushing the tablet and which when dissolved produces an official Burow's solution having a pH within the range of from 4.0 to 4.5.

Other objects and advantages of this invention will be apparent from the following detailed description thereof.

Surprisingly, I have found that the incorporation of a controlled small amount of sodium bicarbonate or potassium bicarbonate in the mixture subjected to tabletting results in a tablet that is chemically stable in the absence of added water and readily disintegrates and dissolves in water at room temperatures to produce an official Burow's solution. For some unknown reason the apparent acidity is not sufficient to deleteriously affect the chemical stability of the mixture, as long as it remains dry, i. e., out of contact with water. However, in the presence of water, as when the tablet is added to a predetermined volume of water to produce an official Burow's solution, a reaction immediately takes place between the apparent acidity and the alkali metal bicarbonate liberating carbon dioxide. This liberation of carbon dioxide as it continues causes the tablet to become porous increasing the surface area thereof in contact with the water, and thus accelerating the reaction between the metal acetate and the aluminium sulfate to form the desired antiseptic solution having a pH of from 4.0 to 4.5. The acetic acid thus formed reacts with the alkali metal bicarbonate to liberate additional carbon dioxide which still further increases the porosity of the tablet with consequent additional increase in the speed of the desired reaction between the aluminum sulfate and the metallic acetate. Thus, in effect, what might well be termed a chain reaction ensues. Furthermore, the alkali metal bicarbonate in the presence of added water may have a catalytic effect on the desired main reaction between the aluminum sulfate and the metallic acetate. It will be understood that this invention is not limited to the above explanation and whatever the explanation may be, the facts are that the incorporation of the controlled amount of alkali metal bicarbonate in the mixture consisting of crystalline aluminum sulfate and metal acetate, desirably with a binder and boric acid, is chemically stable in the absence of added water and readily dissolves in water at room temperatures to produce a solution having a pH of from 4.0 to 4.5.

As the metal acetate, any metal acetate may be used which forms aluminum acetate when mixed with aluminum sulfate. Examples of such acetates are calcium, barium, bismuth, strontium and lead acetate. Calcium acetate is preferred. The metal acetate may be in a granulated state, i. e., it may be thoroughly mixed with a binder and water, thereafter the mixture granulated and the granulated acetate then thoroughly dried.

As the binder, gelatin, acacia or other suitable binder may be used.

The aluminum sulfate should be in a crystalline form and of a particle size such that the sulfate crystals are larger than the metal acetate granules. If desired, the aluminum sulfate may be mixed with a binder, preferably a water-soluble starch, or other such binder before mixing with the metal acetate. For each unit weight of metal acetate from 1.4 to 2.4 weights of aluminum sulfate are employed.

The alkali metal bicarbonate may be incorporated with the other constituents at any desired stage of the mixing prior to the tabletting. Thus, for example, the alkali metal bicarbonate may be added to the aluminum sulfate crystals mixed with the metal acetate, or conversely the bicarbonate may be added to the metal acetate and the resultant mixture added to the aluminum sulfate. If desired, the metal acetate and the aluminum sulfate may be pre-mixed and the alkali metal bicarbonate mixed with the resultant mixture. The amount of bicarbonate thus incorporated may be from 2% to 6%, preferably 3% to 5%, based on the weight of the total mixture and such that the amount of alkali metal bicarbonate is from $1/10$ to $1/70$ the amount of aluminum sulfate and calcium acetate combined. The resultant tablet will contain from 20 to 50 parts of powdered metal acetate, from 40 to 90 parts of crystalline aluminum sulfate, from about 8 to 15 parts of a binder, from about 1 to about 8 parts of powdered boric acid and from about 2 to 6 parts of alkali metal bicarbonate, the amount of alkali metal bicarbonate being from $1/10$ to $1/70$ the amount of aluminum sulfate and metal acetate combined and the amount of aluminum sulfate being from 1.4 to 2.4 times the amount of metal acetate.

The following examples are given for purposes of illustration only; it will be understood this invention is not limited to these examples. In the preparation of the examples all the ingredients at the time of mixing are in a completely dry state and after thorough mixing are compressed into tablets. The compression may be carried out in any well known tabletting machine, such as the Stokes machine.

*Example I*

46 parts of dry granular aluminum sulfate in the crystalline state are intimately mixed with 11 parts of dry soluble starch and 7 parts of powdered boric acid. To this mixture are added 4 parts of sodium bicarbonate. To the resultant mixture are added 32 parts of calcium acetate in powdered form, and after thorough mixing the resultant mixture is compressed into tablets.

Employing the above mixture to produce tablets each containing 2.2 grams and adding one tablet to a pint of water, a stable buffered aluminum acetate solution of approximately 4.2 pH results. Adding one such tablet to 100 cc. of water produces an official Burow's solution. The tablet dissolves readily when added to water at room temperature producing an effervescent solution having a pH of from 4.0 to 4.5 and requiring no crushing to effect ready dissolution.

*Example II*

| | Parts |
|---|---|
| Calcium acetate powder | 36 |
| Crystalline aluminum sulfate | 54 |
| Boric acid powder | 6 |
| Potassium bicarbonate | 4 |

The ingredients are thoroughly mixed dry and the resultant mixture tabletted.

Tablets produced in accordance with this invention are chemically stable, i. e., may be stored without any danger of decomposition for a practically unlimited time. When a tablet is added to water at room temperature it dissolves readily. Stirring hastens this fast dissolution.

By "granular" or "granulated," as used herein, is meant that each particle consists of a number of particles usually with a binding material holding these particles together. Thus, a granular material is produced by taking the substance in powdered form, mixing it with a binder and water, and thereafter drying, so that granules are produced each consisting of a number of particles of the substance in question. By "crystalline" is meant uncrushed, not powdered particles in which the molecules are arranged in a periodic pattern, namely "crystals."

This application is a continuation-in-part of my copending application Serial No. 367,999, filed July 14, 1953, now abandoned.

It is intended that all matter contained in the above description shall be interpreted as illustrative and not in a limiting sense.

What is claimed is:

1. A therapeutically active, solid and stable preparation in tablet form consisting essentially of a compressed mixture containing from 20 to 50 parts by weight of a metallic acetate powder from the group consisting of calcium, barium, bismuth, strontium and lead acetate, from 40 to 90 parts of dry crystalline aluminum sulfate, said tablet containing aluminum sulfate in amount from 1.4 to 2.4 times the amount of metallic acetate present, and from 2 to 6 parts of a bicarbonate from the group consisting of sodium and potassium bicarbonate, the amount of said bicarbonate present being from $1/10$ to $1/70$ the combined amounts of metallic acetate and aluminum sulfate present.

2. A therapeutically active, solid and stable preparation in tablet form consisting essentially of a compressed mixture containing from 20 to 50 parts by weight of calcium acetate, from 40 to 90 parts of dry crystalline aluminum sulfate and from 2 to 6 parts of sodium bicarbonate, the amount of aluminum sulfate being from 1.4 to 2.4 times the amount of calcium acetate and the amount of sodium bicarbonate being from $1/10$ to $1/70$ the combined amounts of calcium acetate and aluminum sulfate.

3. A therapeutically active, solid stable preparation in tablet form consisting of approximately 32 parts of calcium acetate, 46 parts of crystalline aluminum sulfate, 7 parts of boric acid, 4 parts of sodium bicarbonate and 11 parts of starch.

References Cited in the file of this patent

UNITED STATES PATENTS

| 2,282,290 | Swales | May 5, 1942 |
| 2,297,599 | Wilen | Sept. 29, 1942 |
| 2,371,862 | Wershaw | Mar. 20, 1945 |
| 2,387,244 | Compton et al. | Oct. 23, 1945 |
| 2,637,536 | De Ment | May 5, 1953 |

FOREIGN PATENTS

| 8,907 | Great Britain | of 1890 |